(12) United States Patent
Feenstra et al.

(10) Patent No.: US 9,323,044 B2
(45) Date of Patent: Apr. 26, 2016

(54) ELECTROWETTING DISPLAY DEVICE

(71) Applicant: Liquavista B.V., Eindhoven (NL)

(72) Inventors: Bokke Johannes Feenstra, Nuenen (NL); Andrea Giraldo, Riehen (CH); Anthony John Slack, Lorgues (FR); Kurt Petersdorff Reynhart, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/228,766

(22) Filed: Mar. 28, 2014

(65) Prior Publication Data

US 2014/0211291 A1    Jul. 31, 2014

Related U.S. Application Data

(63) Continuation of application No. PCT/EP2013/073295, filed on Nov. 7, 2013.

(30) Foreign Application Priority Data

Nov. 8, 2012    (GB) .................................. 1220153.9

(51) Int. Cl.
| | |
|---|---|
| *G02B 1/06* | (2006.01) |
| *G02B 3/12* | (2006.01) |
| *G02B 26/00* | (2006.01) |
| *G09G 3/34* | (2006.01) |
| *G09G 3/20* | (2006.01) |

(52) U.S. Cl.
CPC .............. *G02B 26/005* (2013.01); *G09G 3/348* (2013.01); *G09G 3/207* (2013.01); *G09G 2310/0264* (2013.01); *Y10T 29/49117* (2015.01)

(58) Field of Classification Search
CPC ....... G02B 3/14; G02B 26/004; G02B 26/005
USPC .................................................. 359/665, 666
See application file for complete search history.

(56) References Cited

U.S. PATENT DOCUMENTS

| | | |
|---|---|---|
| 2007/0019006 A1 | 1/2007 | Marcu et al. |
| 2008/0117346 A1 | 5/2008 | Jepsen |
| 2010/0128015 A1 | 5/2010 | Feenstra et al. |
| 2011/0019262 A1* | 1/2011 | Watanabe .............. G02B 5/201 359/290 |
| 2011/0286073 A1 | 11/2011 | Lo et al. |
| 2012/0212792 A1 | 8/2012 | Brown Elliott |

FOREIGN PATENT DOCUMENTS

| | | |
|---|---|---|
| WO | 03071346 A1 | 8/2003 |
| WO | 2005098797 A2 | 10/2005 |
| WO | 2008142085 A2 | 11/2008 |
| WO | 2013050515 A2 | 4/2013 |

* cited by examiner

*Primary Examiner* — William Choi
(74) *Attorney, Agent, or Firm* — BainwoodHuang

(57) ABSTRACT

An electrowetting display device includes a greyscale picture element layer having at least one first picture element having a first fluid configurable to provide a greyscale display state, and a color picture element layer having at least one second picture element having a second fluid configurable to provide a color display state.

24 Claims, 5 Drawing Sheets

ELECTROWETTING DISPLAY DEVICE

CROSS REFERENCE TO RELATED APPLICATIONS

This application is a continuation under 35 U.S.C. §120 of PCT Application No. PCT/EP2013/073295 filed Nov. 7, 2013.

BACKGROUND

Electrowetting display devices are known with multiple display layers. In a pixel, each layer may be a liquid acting as a different colour filter, so that by appropriate switching of the colour filter layers a full colour pixel may be provided.

It is desirable to provide an improved electrowetting display device.

DETAILED DESCRIPTION

Figure 1:
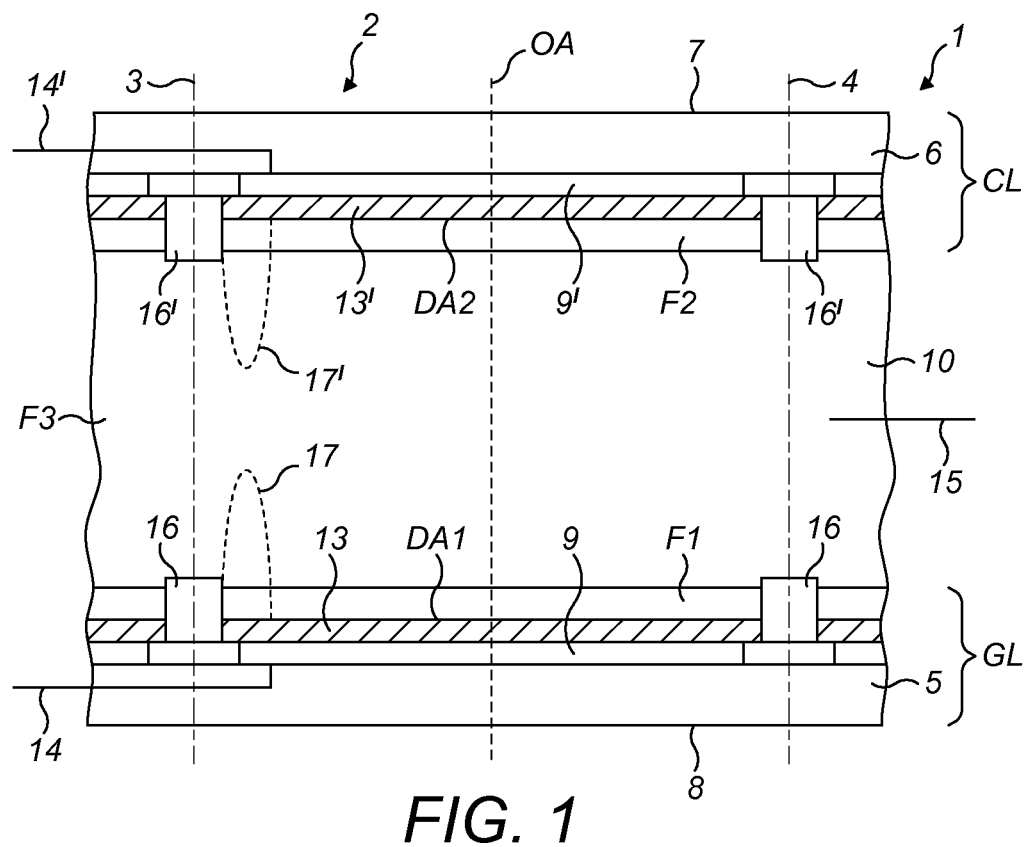
FIG. 1 shows schematically picture elements according to an embodiment.

The entire contents of the following patent documents are incorporated by reference herein:
1. GB 1220153.9 filed Nov. 8, 2012
2. PCT/EP2013/073295 filed Nov. 7, 2013

In accordance with first embodiments, there is provided an electrowetting display device comprising:

a greyscale picture element layer comprising at least one first picture element having a first fluid configurable to provide a greyscale display state;

a colour picture element layer comprising at least one second picture element having a second fluid configurable to provide a colour display state, each of the at least one first picture element and the at least one second picture element having a display area for providing a display effect thereover; and a control system arranged to change a configuration of the first fluid and the second fluid by changing a voltage applied to at least one first electrode associated with the at least one first picture element and at least one second electrode associated with the at least one second picture element, respectively.

By providing a greyscale picture element layer and a separate colour picture element layer, the electrowetting display device can provide high quality and high brightness greyscale images and high quality colour images independently of each other. In an example, having a dedicated picture element layer for colour and another dedicated picture element layer for greyscales allows each layer to be optimised for desired properties for colour and greyscale images, rather than in known systems where the colour properties of a colour filter may be compromised so the colour filter may contribute to both colour and greyscale display states. Moreover, embodiments are simpler to manufacture than known systems with three or more picture element layers, particularly as each greyscale picture element may comprise a first fluid of the same composition. It is noted that in examples described below, a resolution of the colour layer may be less than a resolution of the greyscale layer; however, it has been found that, despite this, high quality colour images and greyscale images may be provided.

The term "greyscale" used herein in relation to the greyscale picture element layer and the greyscale display state is defined as a colour of the range between the extremes of white and black. Therefore the term "greyscale" is limited to include black, white and grey colours, being a lighter intensity of black than the black extreme.

The term "colour" used herein in relation to the colour picture element layer and the colour display state is defined as any other colour than a greyscale colour defined above, and therefore includes red, blue and green, for example.

In an embodiment, said at least one first picture element is arranged on at least one optical axis in common with said at least one second picture element. Therefore, light passing along the optical axis will pass through at least one first picture element and at least one second picture element.

In an embodiment, each one of said at least one first picture element is aligned along an optical axis with the at least one second picture element. Therefore, in an example, the at least one first picture element is a plurality of picture elements arranged in a matrix, and the at least one second picture element is a plurality of picture elements also arranged in a matrix, with each first picture element being aligned with one of the second picture elements.

In an embodiment, the first fluid is arranged to absorb substantially all wavelengths in the visible electromagnetic radiation spectrum. The term "absorb substantially" in this context means to absorb 75% or greater, for example 80%, 85%, 90%, 95% or 100%. For example the first fluid may be arranged to provide a black display state when configured to cover the display area of the at least one first picture element.

In another embodiment, the second fluid of a first one, a second one and a third one of the at least one second picture element is arranged as a colour filter of a first, second and third colour, respectively. Such colours are not greyscale colours. Therefore, for example, the first colour may be red, the second colour may be green, and the third colour may be blue.

In embodiments, the control system is configured to switch the electrowetting display device between:

a colour display mode where the first fluid does not substantially cover the display area of each of said at least one first picture element; and a greyscale display mode where the second fluid does not substantially cover the display area of each of said at least one second picture element.

In such embodiments, the electrowetting display device may be switched between a dedicated colour display mode and a dedicated greyscale mode.

The term "substantially" used above is defined as 50% or greater, for example 60%, 70%, 80%, 90%, 95% or greater. Therefore, the phrase "first fluid does not substantially cover the display area" means that 50% or greater of the display area is not covered by the first fluid and the phrase "second fluid does not substantially cover the display area" means that 50% or greater of the display area is not covered by the second fluid.

In an example, the control system is configured to switch simultaneously each of said at least one first picture element for the colour display mode. In this way, the control system may simultaneously apply a voltage to the first electrode for each first picture element such that the first fluid does not substantially cover the display area of the at least one first picture element.

In another example, the control system is configured to switch simultaneously each of said at least one second picture element for the greyscale display mode. In this way, the control system may simultaneously apply a voltage to the second electrode for each second picture element such that the second fluid does not substantially cover the display area of the at least one second picture element.

In a further embodiment, when the electrowetting display device is in the colour display mode, the control system is arranged to change a configuration of the second fluid of each of the at least one second picture element independently. In this way, a colour display state of each of the at least one second picture element may be controlled and changed differently.

In another embodiment, when the electrowetting display device is in the greyscale display mode, the control system is arranged to change a configuration of the first fluid of each of the at least one first picture element independently. In this way, a greyscale display state of each of the at least one first picture element may be controlled and changed differently.

In a further embodiment, the electrowetting display device comprises a first support plate associated with the greyscale picture element layer, a second support plate associated with the colour picture element layer, and a space between the first support plate and the second support plate, the first fluid and the second fluid being arranged in the space and separated by a third fluid immiscible with the first fluid and the second fluid.

In another embodiment, the first fluid and the second fluid are configurable by the control system to at least partly cover the display area of each of said at least one first picture element and said at least one second picture element, respectively.

In a further embodiment, the configuration of the first fluid of each of said at least one first picture element is independently controllable.

In a yet further embodiment, the configuration of the second fluid of each of said at least one second picture element is independently controllable.

In another embodiment, the at least one first picture element includes a plurality of said first picture element which are controllable simultaneously by the control system to change an extent of the display area of each said first picture element covered by the first fluid, for adjusting a brightness level of an image displayed by the electrowetting display device.

In yet another embodiment, at least one of the at least one second picture element is arranged as a reflective white colour filter, a scattering white colour filter, or with the second fluid being transparent and colourless.

In other embodiments, there is provided a method of manufacturing an electrowetting display device comprising:

providing a greyscale picture element layer comprising at least one first picture element having a first fluid configurable to provide a greyscale display state;

providing a colour picture element layer comprising at least one second picture element having a second fluid configurable to provide a colour display state, each of the at least one first picture element and the at least one second picture element having a display area for providing a display effect thereover; and providing a control system arranged to change a configuration of the first fluid and the second fluid by changing a voltage applied to at least one first electrode associated with the at least one first picture element and at least one second electrode associated with the at least one second picture element, respectively.

In further embodiments, there is provided a display controller for controlling an electrowetting display device comprising a greyscale picture element layer comprising at least one first picture element having a first fluid configurable to provide a greyscale display state; and a colour picture element layer comprising at least one second picture element having a second fluid configurable to provide a colour display state, each of the at least one first picture element and the at least one second picture element having a display area for providing a display effect thereover, the display controller being configured to apply a voltage to at least one first electrode associated with the at least one first picture element to change a configuration of the first fluid and thereby change the greyscale display state, and to apply a voltage to at least one second electrode associated with the at least one second picture element to change a configuration of the second fluid and thereby change the colour display state.

Embodiments will now be described in detail.

FIG. 1 shows a diagrammatic cross-section of an embodiment of an electrowetting display device 1. Some features described below are similar to other features described below; such similar features will be referred to using the same reference numeral, marked with a prime, i.e. '; corresponding descriptions for such features should be taken to apply also.

The display device includes a plurality of electrowetting picture elements 2. There is a first layer of picture elements forming a greyscale picture element layer GL and a second layer of picture elements forming a colour picture element layer CL. The greyscale picture element layer comprises at least one first picture element, in this example a plurality of first picture elements, one of which is shown in the Figure. The colour picture element layer comprises at least one second picture element, in this example a plurality of second picture elements, one of which is shown in the Figure.

In this example the at least one first picture element is arranged on at least one optical axis OA in common with the at least one second picture element. The lateral extent of each element illustrated is indicated in the Figure by the two dashed lines 3, 4. As illustrated, in this example, each one of the at least one first picture element is aligned along the optical axis OA with the at least one second picture element. The electrowetting element comprises a first support plate 5 associated with the at least one first picture element and a second support plate 6 associated with the at least one second picture element, respectively. The support plates may be separate parts of each picture element, or the support plates may be shared in common by the plurality of picture elements of the colour picture element layer or the plurality of picture elements of the greyscale picture element layer. The support plates may be made for instance of glass or polymer and may be rigid or flexible.

The display device has a viewing side 7 on which an image formed by the display device can be viewed and a rear side 8. In an alternative embodiment the display may be viewed from the rear side 8. The display device may be of the reflective, transmissive or transflective type. In a reflective display, the first support plate 5 comprises a reflective surface facing the viewing side and the second support plate 6 facing the rear side. In a transmissive display, for example that illustrated in FIG. 1, light passes through the picture element from the rear side to the viewing side along the optical axis OA.

The greyscale picture elements may be driven using an active matrix driving system or a direct drive driving system. The colour picture elements may also be driven using an active matrix driving system or a direct drive driving system.

A space 10 between the support plates is filled with three fluids: a first fluid F1, a second fluid F2 and a third fluid F3.

The third fluid is immiscible with the first fluid and the second fluid and separates the first fluid and the second fluid. The third fluid is electrically conductive or polar, and may be water or a salt solution such as a solution of potassium chloride in a mixture of water and ethyl alcohol. The third fluid may be transparent and colourless. The first and second fluids are electrically non-conductive and may for instance be an alkane like hexadecane or (silicone) oil. A hydrophobic layer 13 is arranged on the first support plate 5, creating a first display area DA1 facing the space 10, for providing a first display effect thereover. An extent of the first display area DA1 is defined by walls as described below. In this example each first picture element has a first display area DA1. The hydrophobic layer 13 may be an uninterrupted layer extending over the plurality of first picture elements or it may be an interrupted layer, each part extending only over one first picture element, as shown in the Figure. The hydrophobic layer 13 may be for instance an amorphous fluoropolymer layer such as AF1600 or another low surface energy polymer.

Additionally, a second hydrophobic layer 13' is arranged on the second support plate 6 thus creating a second display area DA2 facing the space and the first support plate, for providing a second display effect thereover. An extent of the second display area DA2 is defined by walls described below. In this example each second picture element has a second display area DA2. The hydrophobic layer 13' may be an uninterrupted layer extending over the plurality of second picture elements or it may be an interrupted layer, each part extending only over one second picture element, as shown in the Figure. The hydrophobic layer 13' may be for instance an amorphous fluoropolymer layer such as AF1600 or another low surface energy polymer.

The first and second fluids are arranged on at least part of the first display area DA1 and the second display area DA2, respectively, the first, second and third fluids being within part of the space 10.

The hydrophobic character of the layers 13, 13' causes the first and second fluids F1, F2 to adhere preferentially to the hydrophobic layers 13, 13', respectively, since the first fluid and the second fluid have a higher wettability with respect to the surface of the hydrophobic layers 13, 13' than the third fluid. Wettability relates to the relative affinity of a fluid for the surface of a solid. Wettability increases with increasing affinity, and it can be measured by the contact angle formed between the fluid and the solid and measured internal to the fluid of interest. This increases from relative non-wettability at an angle of more than 90° to complete wettability when the contact angle is 0°, in which case the fluid tends to form a film on the surface of the solid.

At least one first electrode is associated with the at least one first picture element. In this example each first picture element of the greyscale layer is associated with a first electrode 9. Further, at least one second picture element of the colour display layer is associated with at least one second electrode 9'. The first and second electrodes 9, 9' are arranged on the first and the second support plates 5, 6, respectively, and are associated with the first and second display areas DA1, DA2, respectively. In this example, each electrode 9, 9' is electrically insulated from electrodes of neighbouring picture elements, as illustrated.

By referring to the first electrode as being associated with the first display area DA1, it is meant that the first electrode is arranged to apply a voltage to the first display area DA1; similarly, the second electrode being associated with the second display area DA2 means the second electrode is arranged to apply a voltage to the second display area DA2. The electrodes 9, 9' are separated from the fluids by an insulator, which may be the hydrophobic layer 13, 13'. In general, the electrodes 9, 9' can be of any desired shape or form and may have a different location relative to the picture element than illustrated. The electrodes 9, 9' are supplied with voltage signals by signal lines 14, 14'. A second signal line 15 is connected to a third electrode which is in contact with the conductive third fluid 11 and is common to all elements, when they are fluidically interconnected by and share the third fluid, uninterrupted by walls. In this case, the third electrode is arranged so a voltage for applying to the first picture element is applied between the first electrode and the third fluid, and so a voltage for applying to the second picture element is applied between the second electrode and the third fluid, the third fluid being common to all elements.

The first picture elements and the second picture elements, specifically a configuration of the first fluid and/or the second fluid, respectively, are controlled by changing a voltage V applied between the signal lines 14, 14' and 15, depending on whether the configuration of the first and/or the second fluids is desired to be changed. The electrodes 9, 9' on the support plates 5, 6 each are connected to a display driving system by a matrix of printed wiring on the support plate. This wiring can be applied by various methods, such as sputtering and structuring or printing techniques.

The lateral extent of the first fluid F1 and the second fluid F2 is constrained to one electrowetting element by walls 16, 16' that follow the cross-section of the first picture element and the second picture element, respectively. In the embodiment shown in FIG. 1 the walls define the extent of the hydrophobic layers 13, 13'. When the hydrophobic layer extends over a plurality of elements, the walls may be arranged on top of the layer. Alternatively, or additionally, the walls may comprise hydrophilic areas for constraining the first fluid and/or the second fluid. The periphery of the space of the display device is sealed using sealing members.

In embodiments, the first fluid is configurable to provide a greyscale display state over the first display area DA1. Therefore, the first fluid is arranged to absorb at least part of the optical spectrum, for example to act as a grey or black colour filter and therefore provide a grey or black display state. In examples to be described, the first fluid is arranged to provide a black display state when configured to substantially cover the display area DA1 of the at least one first picture element, substantially covered meaning greater than 50% coverage, for example 60%, 70%, 80%, 90%, 95% or 100%. In such examples the first fluid may be arranged to absorb substantially all wavelengths in the visible electromagnetic spectrum. It is noted that with a reduced coverage of the display area DA1, the first fluid provides a grey display state, the lightness of the grey display state depending on the extent of coverage of the display area DA1.

In embodiments, the second fluid is configurable to provide a colour display state over the second display area DA2. Therefore, the second fluid is arranged to absorb at least part of the optical spectrum to act as a colour filter. In examples to be described below, the second fluid of the second picture elements may be arranged to act as a colour filter of different colours. Therefore, in an example, a first one of the at least one second picture element, a second one of the at least one second picture element and a third one of the at least one second picture element is arranged as a colour filter of a first, second and third colour, respectively. In an example the first colour is red, the second colour is green and the third colour is blue. Therefore, by appropriately controlling the configuration of the second fluid for each of these three second picture elements, different colour display states may be provided at the viewing side, with a full colour range, as the viewer sees the combination of the three colour display states provided. In a similar manner as described for the first fluid above, changing the extent of coverage of the second fluid over the second display area DA2 of each second picture element determines a lightness of each colour display state provided. It is to be appreciated that although in this example three second picture elements are described for providing red, green and blue display states, the second fluid of further of the second picture elements may also be arranged as a red, green and blue colour filter, so as to provide full colour display states across the colour picture element layer.

It is to be appreciated that the wavelengths of the electromagnetic spectrum which the first fluid and the second fluid of different picture elements are to absorb, and which part of the spectrum is to be transmitted, are determined by adding appropriate pigment particles or dye to the first and second fluids.

When the voltage V applied between the signal lines 14 and/or 14', and 15, is set at a non-zero signal level of sufficient magnitude the first and/or second picture element will enter into an active state. Electrostatic forces will move the third fluid F3 towards the electrodes 9 and/or 9', thereby pushing away and displacing the first fluid F1 and/or the second fluid F2 from at least part of the display area DA1, DA2 of the hydrophobic layers 13, 13' towards the walls 16, 16' surrounding the display areas of the hydrophobic layer. When fully repelled the first and second fluids are in a drop-like form as schematically indicated by a dashed line 17, 17'. This action contracts the first and second fluids to uncover the display areas DA1, DA2 of the hydrophobic layers 13, 13' of the electrowetting element. In such a contracted state, the first fluid F1 does not substantially cover the first display area DA1 of the first picture element; instead the third fluid F3 substantially covers the first display area DA1. Similarly, in such a contracted state, the second fluid F2 does not substantially cover the second display area DA2 of the second picture element; instead the third fluid F3 substantially covers the second display area DA2.

When the voltage across the first and/or second element is returned to an inactive signal level of zero for sufficient duration, the first and/or second element will return to an inactive state, where the first and second fluids flow back to substantially cover the first and second display areas DA1, DA2 of the hydrophobic layers 13, 13', respectively. In this way the first fluid and second fluid form an electrically controllable optical switch in the first and second picture elements, respectively. It will be appreciated that the first and the second fluid may be switched independently of each other, for instance by applying a voltage between the signal line 14 and the common signal line 15 for the first fluid, and separately by applying a voltage between the signal line 14' and the common signal line 15 for the second fluid.

The first and second electrowetting picture elements form series capacitors. The third fluid F3 and the electrodes 9, 9' form the plates and the first fluid F1 and the second fluid F2 and the hydrophobic layers 13, 13' the dielectric layers. When the first and second picture elements are in the active state, for example with the first and second fluids having the form 17, 17', the capacitance of the elements is higher than when the elements are in the inactive state, for example with the first and second fluids having the form to substantially cover the first and second display areas DA1, DA2. Therefore, each of the first fluid and the second fluid acts as its own capacitor that shares a common electrode in the form of the third fluid F3.

Figure 2:
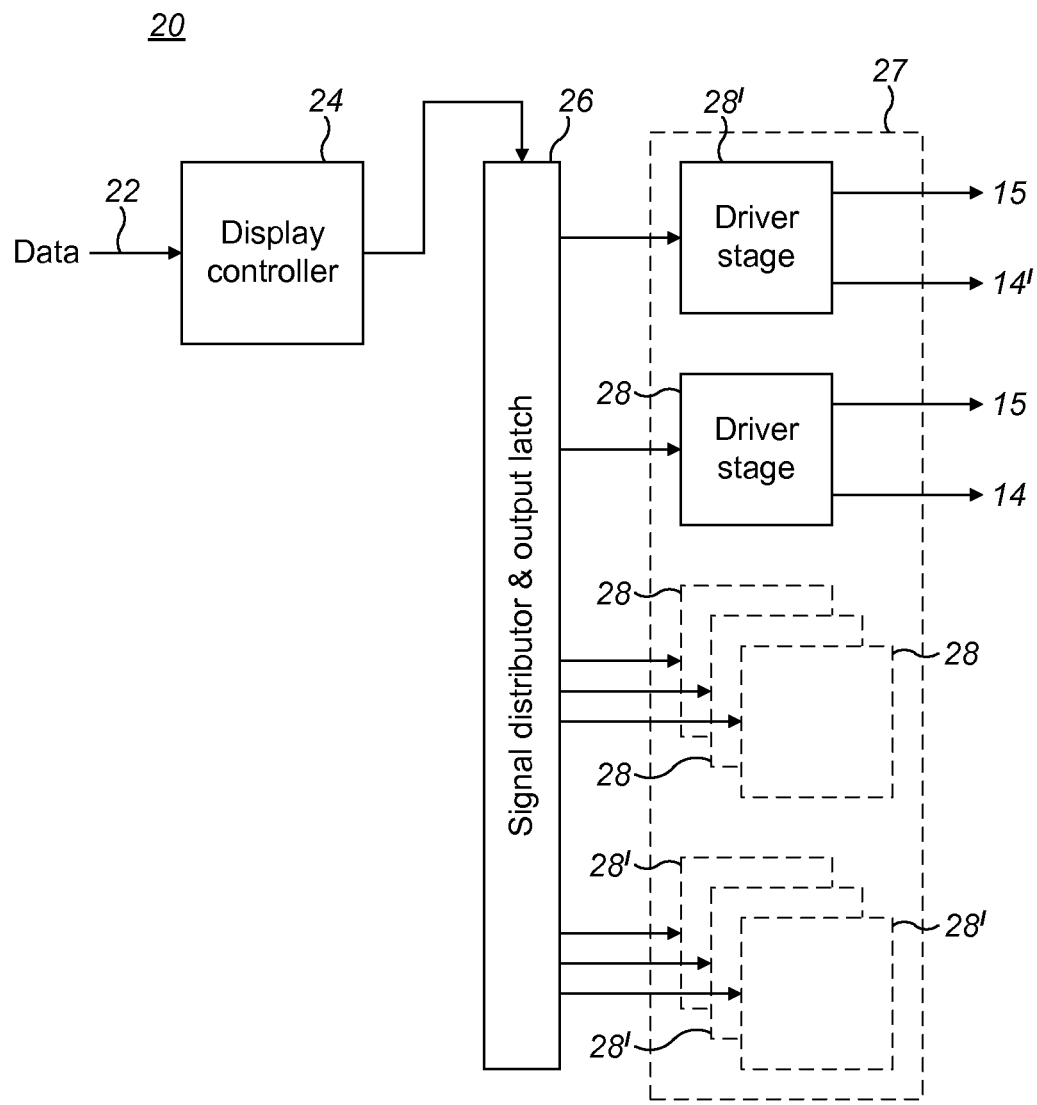
FIG. 2 shows schematically a driving system for an embodiment.

FIG. 2 shows a diagrammatic view of an embodiment of an electrowetting display driving system, including a control system of the display device, according to the embodiments.

The display driving system is of the so-called direct drive type and may be in the form of an integrated circuit adhered to the first and second support plates 5 and 6. Alternatively, the display driving system could be located on just one of the first and second support plates. An active matrix type display may also use such a display driving system. The display driving system 20 includes control logic and switching logic, and is connected to the display by means of signal lines 14, 14' and a common signal line 15. Each electrode signal line 14 connects an output from the display driving system 20 to a different first electrode 9, respectively. The common signal line is connected to the third, conductive fluid F3 through an electrode. Also included are one or more input data lines 22, whereby the display driving system can be instructed with data so as to determine which elements should be in an active state and which elements should be in a non-active state at any moment of time.

The embodiment of the controller shown comprises a display controller, 24, e.g. a microcontroller, receiving input data from the input data lines 22 relating to the image to be displayed. The microcontroller, being in this embodiment the control system, is arranged for applying a voltage to the first electrode to provide a first fluid configuration, for example a display state (corresponding with a certain display effect provided on the viewing side), in response to a signal level of the voltage. The microcontroller controls timing and/or a signal level of at least one signal level for a picture element.

The output of the microcontroller is connected to the data input of a signal distributor and data output latch 26. The signal distributor distributes incoming data over a plurality of outputs connected to the display device, which may be via drivers. The signal distributor causes data input indicating that a certain element is to be set in a specific display state to be sent to the output connected to this element. The distributor may be a shift register. The input data is clocked into the shift register and at receipt of a latch pulse the content of the shift register is copied to the output latch. The output latch has one or more outputs, connected to a driver assembly 27. The outputs of the latch are connected to the inputs of one or more driver stages 28 (also referred to below as drivers) within the driving system. The outputs of each driver stage are connected through the signal lines 14, 14' and common signal line 15 of a corresponding picture element. In response to the input data a driver stage will output a voltage of the signal level set by the microcontroller to set one of the elements in a corresponding display state.

Thus, the configuration of the first and the third fluid may be controlled by applying a voltage level of a first voltage to the first electrode 9. Similarly, the control system of the display device is arranged to control the configuration of the second fluid and the third fluid, by applying a voltage level of a second voltage to the second electrode 9', by using similar components as those described above, such as the driver stage, which are indicated in FIG. 2 using the same reference numerals marked with a prime character, i.e. '.

In examples described below, the control system is configured to switch the electrowetting display device into at least one different display mode. In one example the control system is configured to switch the device between a colour display mode, where the first fluid does not substantially cover the display area DA1 of each of the at least one first picture element, the third fluid substantially covering the first display area DA1 therefore, and a greyscale display mode, where the second fluid does not substantially cover the display area DA2 of each of the at least one second picture element, the third fluid substantially covering the second display area DA2 therefore. When the device is in the colour display mode, the control system is arranged to change a configuration of the second fluid of each of the at least one second picture element independently. Therefore, a colour display state of each of the second picture elements may be provided in accordance with a colour image to be provided at the viewing side. As the first fluid does not substantially cover the first display area DA1, there is no or a minimum greyscale provided at the viewing side. The control system may be configured to switch simultaneously each of the at least one first picture element for the colour display mode, i.e. so the first fluids contract so as to not substantially cover the first display areas DA1.

When the device is instead in the greyscale display mode, the control system is arranged to change a configuration of the first fluid of each of the at least one first picture element independently. Therefore, a greyscale display state of each of the first picture elements may be provided in accordance with a greyscale image to be provided at the viewing side. For example, if all of the first fluid substantially covers the first display areas DA1, a black display state may be provided at the viewing side. The control system may be configured to switch simultaneously each of the at least one second picture element for the greyscale display mode, i.e. so the second fluids contract so as to not substantially cover the second display areas DA2.

In an example, the control system may be configured to operate the display device only in the colour display mode and the greyscale display mode. In other examples, further display modes are envisaged. For example the control system may be configured to switch the display device to a hybrid display mode where the first fluid of at least one of the first picture elements and the second fluid of at least one of the second picture elements may be configured by the control system to at least partly cover the first display area DA1 and the second display area DA2, respectively. In such a hybrid mode the configuration of the first and/or second fluids of each picture element may be controllable independently, for example, or in other examples more than one picture element may be grouped for controlling together; for example, a plurality of the first picture elements may be controllable simultaneously, to change the extent of coverage of the first display areas DA1, to adjust the amount of light passing through the colour picture element layer, thereby adjusting a brightness level of the display.

Figure 3A:
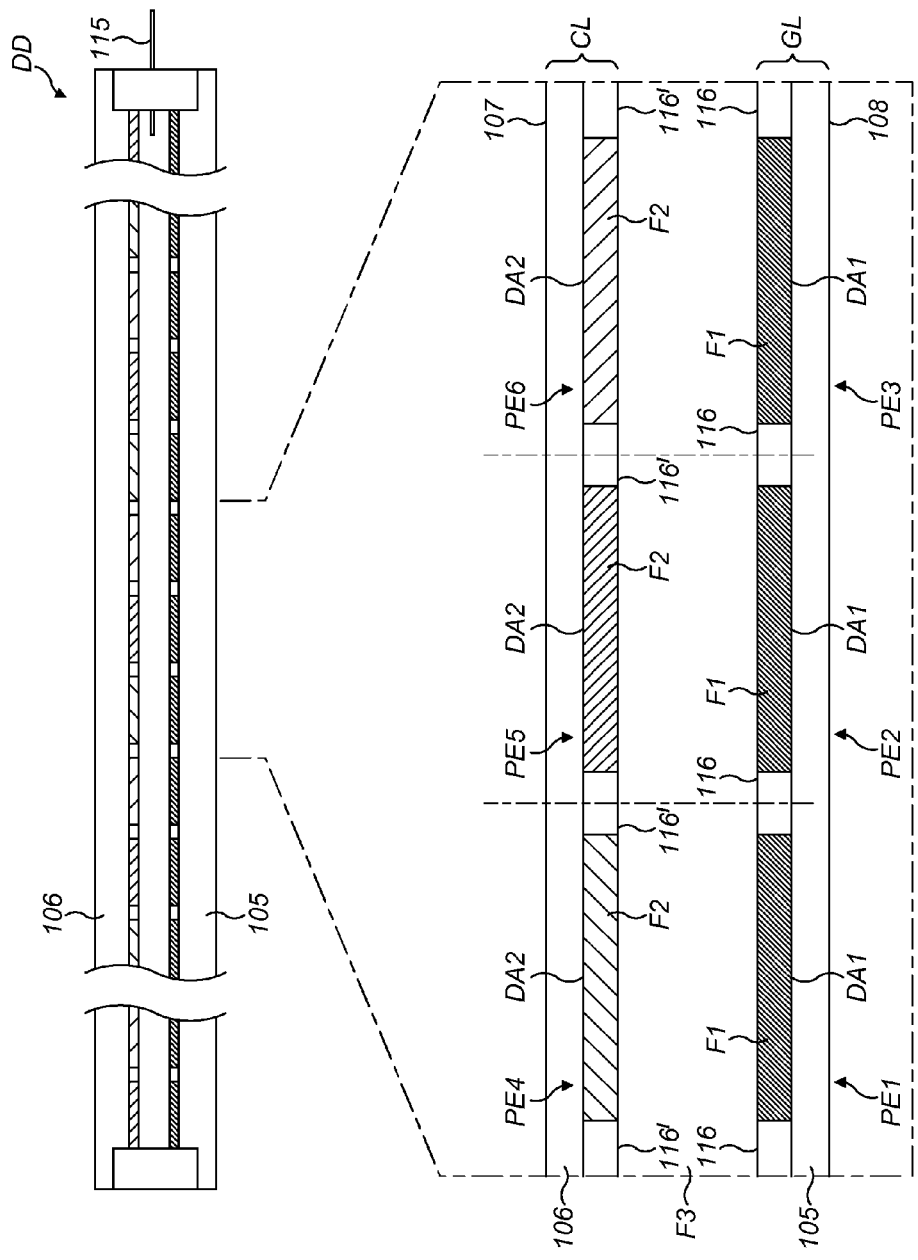
FIGS. 3a, 3b and 3c illustrate schematically picture elements according to an embodiment.
Figure 3B:
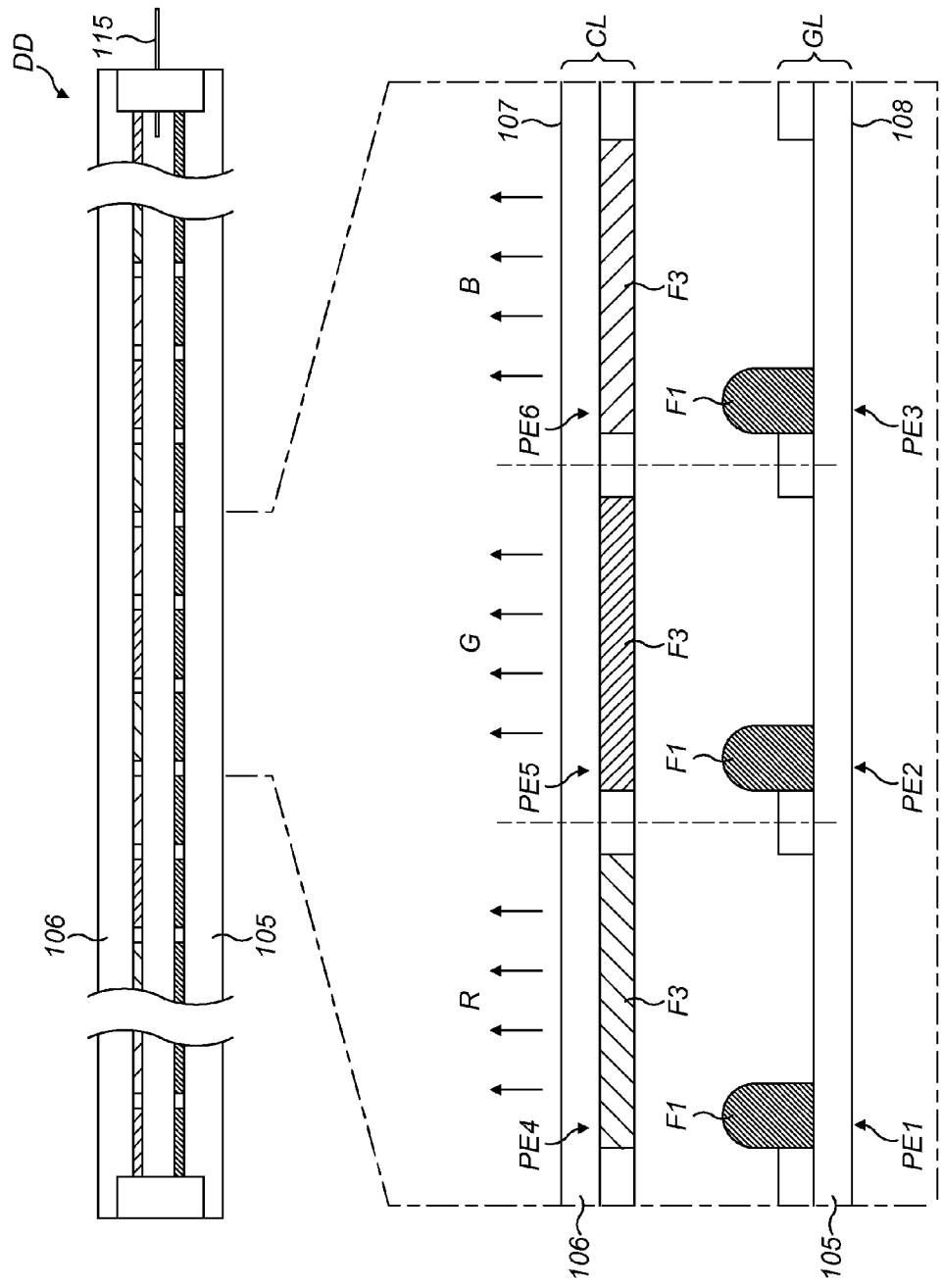
Figure 3C:
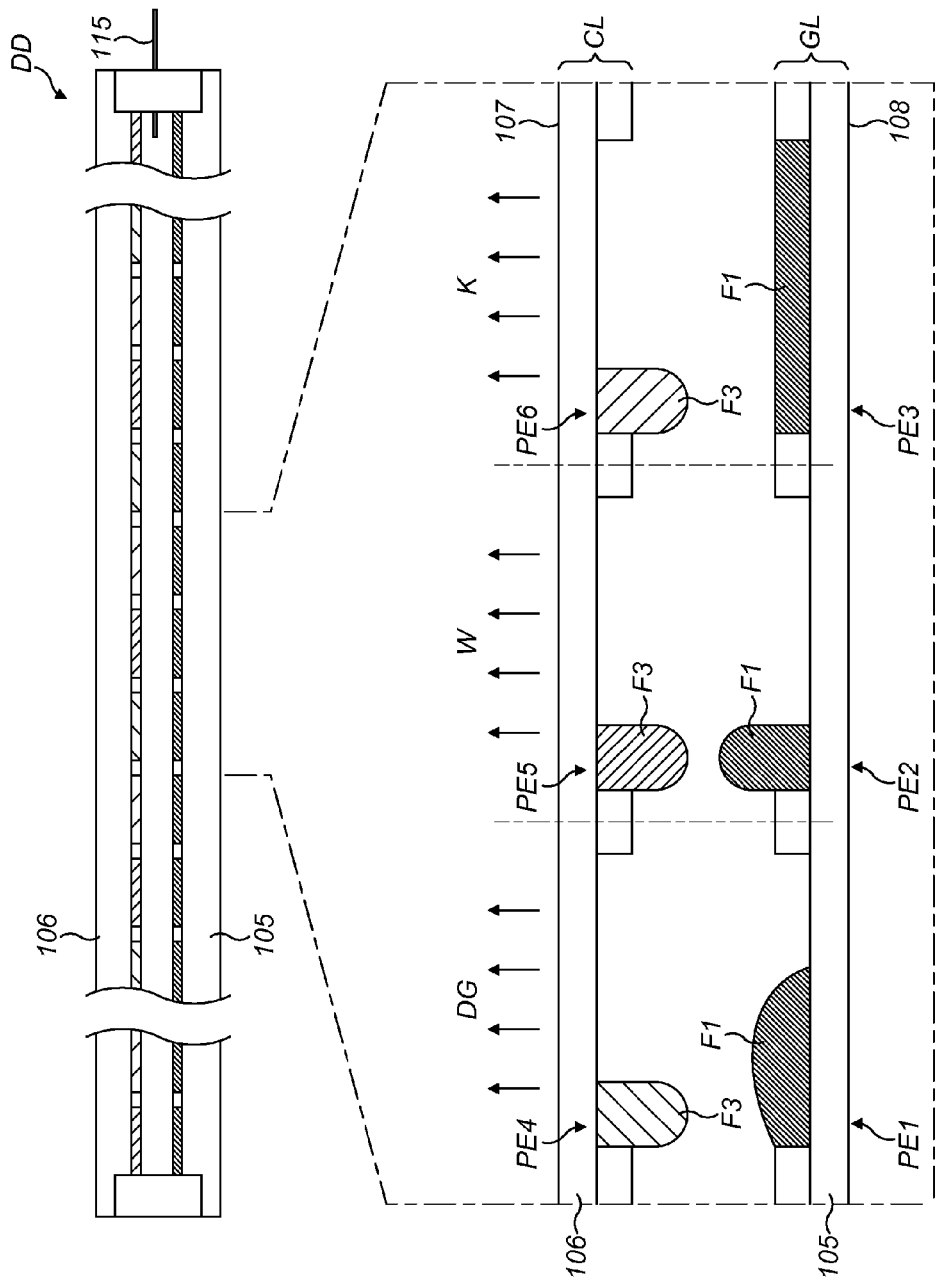

FIGS. 3a, 3b and 3c illustrate schematically an example of an electrowetting display device in accordance with embodiments. Features of the picture elements described using FIGS. 3a, 3b and 3c correspond with similar features described above and the same reference numerals are used in FIGS. 3a, 3b and 3c, incremented by 100; corresponding descriptions should be taken to apply here also. For clarity of illustration, electrodes and hydrophobic layers are not shown, but are to be understood as part of the display device DD in accordance with electrodes 9, 9' and hydrophobic layers 13, 13' of picture elements described previously.

As illustrated there is a colour picture element layer CL comprising only colour picture elements, and a greyscale picture element layer GL comprising only greyscale picture elements, of the display device DD. Three picture elements PE1, PE2, PE3 of the greyscale picture element layer are illustrated, with the first fluid F1 of each being configured as a black colour filter for absorbing all wavelengths in the visible electromagnetic spectrum. Three picture elements PE4, PE5, PE6 of the colour picture element layer are illustrated, with the second fluid F2 of each being configured as a red, green and blue colour filter, respectively.

FIG. 3a shows the display device in an off state, where the first fluid and the second fluid of each picture element substantially covers the first display areas DA1 and the second display areas DA2, respectively. With the first fluid being black, light passing from the rear side 108 is absorbed by the black first fluid, thus providing a black display state at the viewing side 107.

FIG. 3b shows the display device in the colour display mode described above. The first fluid in each of the greyscale picture elements, including PE1, PE2, PE3 illustrated, does not substantially cover the first display area DA1. Therefore, with the second fluid in the illustrated colour picture elements PE4, PE5, PE6 substantially covering the second display areas DA2, the three colour picture elements illustrated provide a red, green and blue display state (R, G, B as illustrated) at the viewing side. The configuration of the second fluid of each colour picture element is independently configurable in this example of the colour display mode, and therefore the colour and intensity of coloured display state provided at the viewing side for each colour picture element may be configured in accordance with a coloured image for displaying at the viewing side.

FIG. 3c shows the display device in the greyscale display mode described above. The second fluid in each of the colour picture elements, including PE4, PE5, PE6 illustrated, does not substantially cover the second display area DA2. Therefore, the display state provided at the viewing side depends on the first fluid configuration in each greyscale picture element. As illustrated, the first fluid configuration of each picture element may be different, and independently controlled, for example to have a different coverage of the first display areas DA1. In this example, the picture element PE1 provides a dark grey display state, the picture element PE2 provides a white display state, and picture element PE3 provides a black display state (DG, W and K as illustrated).

It should be noted that the thickness of the first and second fluids and the concentration of a pigment or dye in the first and second fluids influences the light absorbance. Therefore, the fluid thickness and concentration may be selected to provide the desired display states.

In further embodiments it is envisaged that the second fluid may be configured as differently coloured colour filters than described above. In another example, each picture element of the colour layer may be arranged as a colour filter of the same colour.

In examples, a white display state may be provided in different ways. For example, both the first fluid and the second fluid may be contracted, such that white light from a backlight may be transmitted substantially through a colourless and transparent third fluid. In another example, at least one picture element in the colour picture element layer may be arranged as a reflective or scattering white colour filter, for example by suspending white pigment such as titanium dioxide in the second fluid. By appropriate switching of the first picture elements, when the display device is in the colour display mode, a white display state may be provided. Or, at least one picture element in the colour picture element layer may be arranged as a transparent and colourless second fluid, to give uniform switching properties to the picture elements of the colour picture element display layer.

It is noted that the first picture elements and the second picture elements may be arranged in matrix configurations. For example, the first picture elements may be arranged in repeating groups of three picture elements of different colours, for example red, green and blue. The lateral extent of the first picture elements may be the same as, and aligned along the optical axis, the lateral extent of the second picture elements. Thus, where the colour layer comprises repeating groups of red, green and blue elements, the resolution of an image displayable with the device in the greyscale display mode may be three times higher than the resolution of an image displayable with the device in the colour display mode. Alternatively, each first picture element may have a lateral extent which aligns with the lateral extent of three second picture elements, for example a group of red, green and blue elements. In this way, the resolution of an image from the colour display mode may be the same as the greyscale display mode.

In further embodiments, there is provided a method. Such a display device may for example be manufactured according to the method described in PCT patent publication no. WO2005/098797; different coloured fluids may be provided in different picture elements of a picture element layer using ink jet dosing, for example.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting display device comprising:
   a first support plate;
   a second support plate;
   a greyscale picture element layer associated with the first support plate, the greyscale picture element layer comprising at least one first picture element having a first fluid configurable to provide a greyscale display state;
   a colour picture element layer associated with the second support plate, the colour picture element layer comprising a plurality of second picture elements each having a second fluid configurable to provide a colour display state,
       the second fluid of a first one of the plurality of second picture elements configured as a first colour filter of a first colour,
       the second fluid of a second one of the plurality of second picture elements configured as a second colour filter of a second colour different from the first colour, and
       the second fluid of a third one of the plurality of second picture elements configured as a third colour filter of a third colour different from the first colour and the second colour,
   each of the at least one first picture element and the plurality of second picture elements having a respective display area for providing a display effect thereover;
   a space between the first support plate and the second support plate, the first fluid and the second fluid of at least one of the plurality of second picture elements arranged in the space and separated by a third fluid immiscible with the first fluid and the second fluid; and
   a control system arranged to change:
       a configuration of the first fluid of the at least one first picture element by changing a first voltage applied to at least one first electrode associated respectively with the at least one first picture element; and
       a configuration of the second fluid of at least one of the plurality of second picture elements by changing a second voltage applied to at least one second electrode associated respectively with the at least one of the plurality of second picture elements.

2. An electrowetting display device according to claim 1, wherein the at least one first picture element is arranged respectively on at least one respective optical axis in common with a respective second picture element of the plurality of second picture elements.

3. An electrowetting display device according to claim 1, wherein each of the at least one first picture element is aligned respectively along a respective optical axis with a respective second picture element of the plurality of second picture elements.

4. An electrowetting display device according to claim 1, wherein the first fluid is arranged to absorb one or more of: 75%, greater than 75%, 80%, 85%, 90%, 95%, 100% or substantially all wavelengths in the visible electromagnetic radiation spectrum.

5. An electrowetting display device according to claim 1, wherein the first colour is red, the second colour is green, and the third colour is blue.

6. An electrowetting display device according to claim 1, wherein the control system is configured to switch the electrowetting display device between:
   a colour display mode where the first fluid does not substantially cover the respective display area of each of the at least one first picture element; and
   a greyscale display mode where the second fluid does not substantially cover the respective display area of each of the plurality of second picture elements.

7. An electrowetting display device according to claim 6, wherein the control system is configured to switch substantially simultaneously each of the at least one first picture element for the colour display mode.

8. An electrowetting display device according to claim 6, wherein the control system is configured to switch substantially simultaneously each of the plurality of second picture elements for the greyscale display mode.

9. An electrowetting display device according to claim 6, wherein, in the colour display mode, the control system is arranged to change a configuration of the second fluid of each of the plurality of second picture elements independently.

10. An electrowetting display device according to claim 6, wherein, in the greyscale display mode, the control system is arranged to change a configuration of the first fluid of each of the at least one first picture element independently.

11. An electrowetting display device according to claim 1, wherein the first fluid is configurable by the control system to at least partly cover the respective display area of the at least one first picture element, and the second fluid is configurable by the control system to at least partly cover the respective display area of at least one of the plurality of second picture elements.

12. An electrowetting display device according to claim 11, wherein the first fluid is arranged to provide a black display state with a configuration covering the respective display area of the at least one first picture element.

13. An electrowetting display device according to claim 11, the configuration of the first fluid of each of the at least one first picture element being independently controllable.

14. An electrowetting display device according to claim 11, the configuration of the second fluid of each of the plurality of second picture elements being independently controllable.

15. An electrowetting display device according to claim 1, wherein the at least one first picture element is a plurality of the first picture element which each are controllable substantially simultaneously by the control system to change an extent of the respective display area of each of the plurality of the first picture element covered by the first fluid.

16. An electrowetting display device according to claim 1, wherein at least one of the plurality of second picture elements is arranged as a reflective white colour filter, a scattering white colour filter, or with the second fluid being transparent and colourless.

17. An electrowetting display device according to claim 1, wherein the control system comprises:
a first driver stage connected to the at least one first electrode;
a second driver stage connected to the at least one second electrode; and
a display controller configured to output one or more of:
at least one first voltage signal indicative of the first voltage, for controlling the first driver stage to output the first voltage applied to the at least one first electrode; or
at least one second voltage signal indicative of the second voltage, for controlling the second driver stage to output the second voltage applied to the at least one second electrode.

18. A method of manufacturing an electrowetting display device comprising:
providing a first support plate;
positioning a second support plate such that there is a space between the first support plate and the second support plate;
providing a greyscale picture element layer associated with the first support plate, the greyscale picture element layer comprising at least one first picture element having a first fluid configurable to provide a greyscale display state, the first fluid arranged in the space;
providing a colour picture element layer associated with the second support plate, the colour picture element layer comprising a plurality of second picture elements each having a second fluid configurable to provide a colour display state, the second fluid of at least one of the plurality of second picture elements arranged in the space,
the second fluid of a first one of the plurality of second picture elements configured as a first colour filter of a first colour,
the second fluid of a second one of the plurality of second picture elements configured as a second colour filter of a second colour different from the first colour, and
the second fluid of a third one of the plurality of second picture elements configured as a third colour filter of a third colour different from the first colour and the second colour,
each of the at least one first picture element and the plurality of second picture elements having a respective display area for providing a display effect thereover;
providing, in the space, a third fluid immiscible with the first fluid and the second fluid, the third fluid separating the first fluid and the second fluid of at least one of the plurality of second picture elements; and
providing a control system arranged to change:
a configuration of the first fluid of the at least one first picture element by changing a first voltage applied to at least one first electrode associated respectively with the at least one first picture element; and
a configuration of the second fluid of at least one of the plurality of second picture elements by changing a second voltage applied to at least one second electrode associated respectively with the at least one of the plurality of second picture elements.

19. A method of manufacturing an electrowetting display device according to claim 18, wherein the first fluid is arranged to absorb one or more of: 75%, greater than 75%, 80%, 90%, 95%, 100% or substantially all wavelengths in the visible electromagnetic radiation spectrum.

20. A method according to claim 18, wherein the first colour is red, the second colour is green, and the third colour is blue.

21. A display controller for controlling an electrowetting display device comprising a first support plate; a second support plate; a greyscale picture element layer associated with the first support plate, the greyscale picture element layer comprising at least one first picture element having a first fluid configurable to provide a greyscale display state; and a colour picture element layer associated with the second support plate, the colour picture element layer comprising a plurality of second picture elements each having a second fluid configurable to provide a colour display state,
the second fluid of a first one of the plurality of second picture elements configured as a first colour filter of a first colour,
the second fluid of a second one of the plurality of second picture elements configured as a second colour filter of a second colour different from the first colour, and
the second fluid of a third one of the plurality of second picture elements configured as a third colour filter of a third colour different from the first colour and the second colour,
each of the at least one first picture element and the plurality of second picture elements having a respective display area for providing a display effect thereover,
the electrowetting display device further comprising a space between the first support plate and the second support plate, the first fluid and the second fluid of at least one of the plurality of second picture elements arranged in the space and separated by a third fluid immiscible with the first fluid and the second fluid;
wherein the display controller is configured:
to control applying a first voltage to at least one first electrode associated respectively with the at least one first picture element to change a configuration of the first fluid and thereby change the greyscale display state, and
to control applying a second voltage to at least one second electrode associated respectively with the plurality of second picture elements to change a configuration of the second fluid and thereby change the colour display state.

22. A display controller according to claim 21, configured to switch the electrowetting display device between:
a colour display mode where the first fluid does not substantially cover the respective display area of each of the at least one first picture element; and
a greyscale display mode where the second fluid does not substantially cover the respective display area of each of the plurality of second picture elements.

23. A display controller according to claim 21, configured to:
configure the first fluid to at least partly cover the respective display area of the at least one first picture element, and
configure the second fluid to at least partly cover the respective display area of at least one of the plurality of second picture elements.

24. A display controller according to claim 21, wherein the at least one first picture element is a plurality of the first picture element, the display controller configured to control each of the plurality of the first picture element substantially simultaneously to change an extent of the respective display area of each of the plurality of the first picture element covered by the first fluid.

* * * * *